United States Patent [19]

Hengelmolen

[11] Patent Number: 5,035,402
[45] Date of Patent: Jul. 30, 1991

[54] FURNACES

[75] Inventor: Adrianus J. Hengelmolen, Dreumel, Netherlands

[73] Assignee: Copermill Limited, Nottingham, England

[21] Appl. No.: 260,399

[22] Filed: Oct. 20, 1988

[30] Foreign Application Priority Data

Oct. 24, 1987 [GB] United Kingdom ............... 8724944

[51] Int. Cl.⁵ .............................................. C21D 11/00
[52] U.S. Cl. ..................................... 266/88; 75/44 S; 266/78; 266/144
[58] Field of Search ................... 75/44 S; 266/88, 78, 266/144

[56] References Cited

U.S. PATENT DOCUMENTS 2,264,740 12/1941 Brown .
3,163,520 12/1964 Collin ................................ 75/44 S
3,933,343 1/1976 Rawlings .

FOREIGN PATENT DOCUMENTS 0050795 10/1981 European Pat. Off. .
726802 10/1942 Fed. Rep. of Germany .

Primary Examiner—Peter D. Rosenberg
Attorney, Agent, or Firm—Paul & Paul

[57] ABSTRACT

The furnace comprises two chambers, a closed well melting chamber and a main heating chamber. The furnace includes a hot gas duct connecting the chambers, the hot gas duct having a damper to control the gas flow between chambers in accordance with the respective condition of each chamber. The furnace is designed to have an efficient liquid metal flow by sloping the floor.

10 Claims, 4 Drawing Sheets

FURNACES

The present invention relates to furnaces and more particularly to furnaces for melting scrap metal and in particular aluminium.

A first known furnace for melting scrap material is the open well furnace in which metal to be melted is placed into an open bath of molten metal which is kept at a high temperature by an inner furnace, gates being provided to control the flow of metal to and from the inner furnace to control the heating of the scrap metal. Such a furnace has the disadvantage that large amounts of heat are lost by the open bath and although a fume hood is normally provided there is often an escape of polluted flue gases on loading of the furnace.

To counter the above disadvantages Closed Well Furnaces have been designed and these comprise two closed compartments separated by a wall which extends vertically downwards. The molten metal (usually aluminium) is contained within a well and the surface level of the aluminium is above the bottom of the wall thereby dividing the furnace into two separate closed compartments. One compartment comprises a heating compartment in which burners heat the molten metal and the other compartment comprises a melting compartment into which scrap metal and other material to be melted is fed. The scrap metal (usually aluminium) is heated by the bath of molten metal in the well without being subjected to direct heat from burners. This is important in the smelting of aluminium, since aluminium is susceptible to oxidation especially if thin scrap is to be melted.

Such furnaces, however, have the disadvantage that because the scrap material is indirectly heated, the throughput of scrap is relatively low for a given size of furnace.

It is an object of the present invention to provide a CWF furnace which is more efficient than the known above described furnace.

According to the present invention there is provided a Closed Well Furnace comprising a main heating chamber and a closed well melting chamber including a hot gas duct connecting the main heating chamber and the closed well melting chamber the hot gas duct including a hot gas damper operative to close the hot gas duct to prevent flow of hot gas through the duct.

Preferably the position of the hot gas damper is controlled by a control system in accordance with the temperature difference between the main heating chamber and the closed well melting chamber the control system being normally operative to open the damper when the temperature of the main heating chamber is greater than that of the closed well melting chamber.

Preferably the damper is closed when scrap to be melted is being introduced into the closed well melting chamber.

Preferably there is also provided a hot gas exhaust duct connecting the closed well melting chamber with an exhaust flue, the hot gas exhaust duct including an exhaust gas damper operative to effectively seal off the exhaust duct and including means for opening the hot gas damper when the temperature in the closed well heating chamber rises above a predetermined set level.

Preferably during the time period that the temperature in the closed well melting chamber is above the predetermined set level the hot gas damper between the closed well melting chamber and the main heating chamber will be opened to allow gas flow from the closed well melting chamber to the main heating chamber.

According to the present invention there is also provided a closed well furnace comprising a main heating chamber and a closed well melting chamber separated by a refractory dividing wall in which the floor of the well slopes in a downward direction from the melting chamber to the main heating chamber.

Preferably the slope is relatively shallow, being less than 5° from the horizontal.

In a first embodiment the floor of the well is substantially rectangular in shape and, in addition to sloping downwardly towards the main chamber, the floor also slopes diagonally.

In further embodiment the refractory dividing wall is provided with an opening at the surface level of the molten metal to allow a current of metal to flow therethrough.

Embodiments of the present invention will now be described, by way of example with reference to the accompanying drawings in which.

Figure 1:
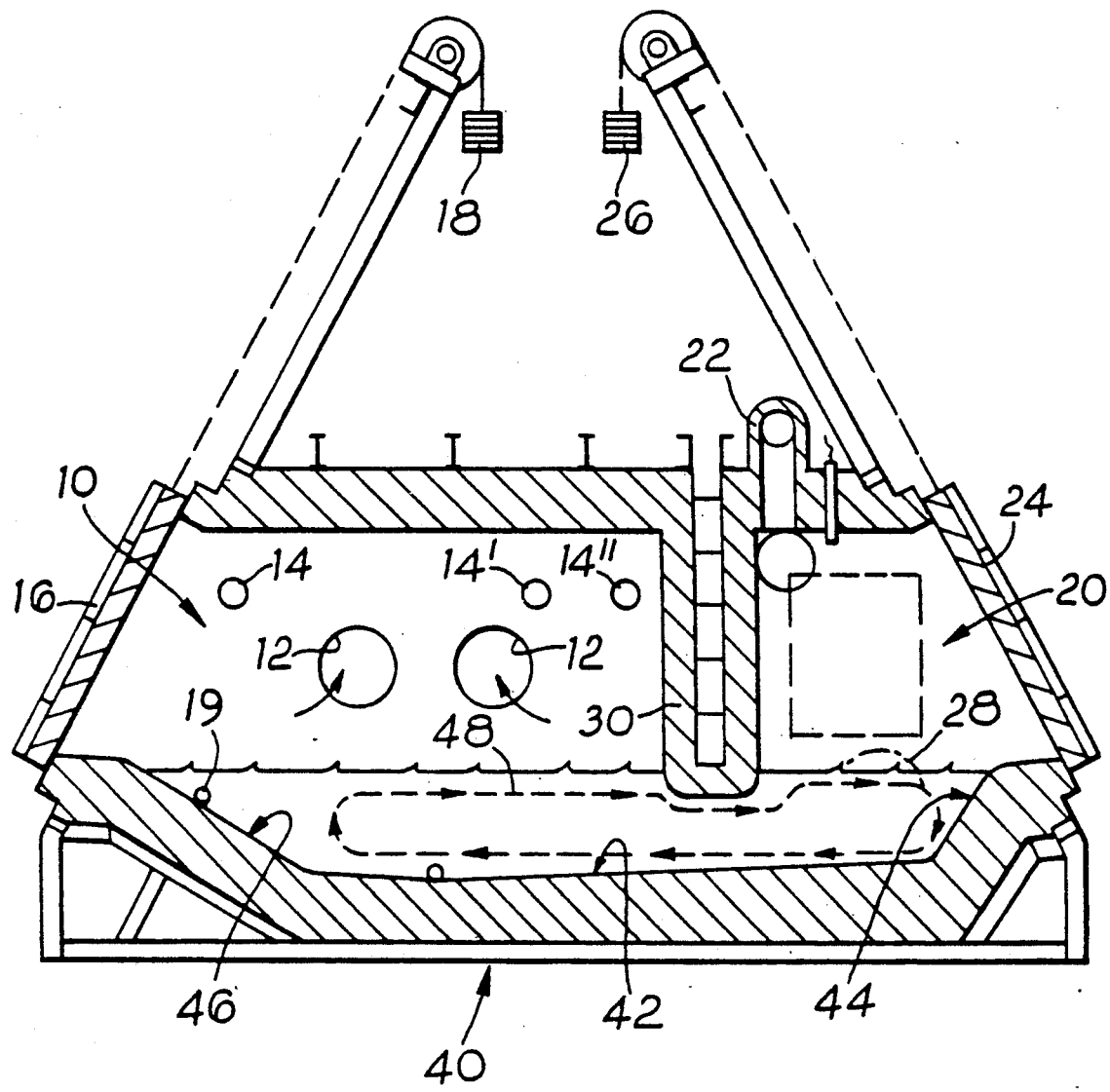
FIG. 1 shows in diagrammatic cross-section a CWF furnace according to the present invention.

With reference to FIG. 1, the CWF furnace comprises a main heating chamber 10 and a closed well melting chamber 20 separated by a dividing wall 30 of refractory material and preferably water or air cooled (not shown). The main heating chamber has exhaust outlets 12 and heating burners 14 and a sliding door 16 preferably counterbalanced by a weight 18. A tapped outlet 19 is also provided controllable by any suitable valve means (not shown).

The melting chamber 20 has an exhaust fume outlet 22 and a sliding door 24 preferably counterbalanced by a weight 26. Aluminium scrap to be melted is placed into chamber 20 via open door 24 and the door is then closed to effectively seal the furnace.

The floor, walls and roof of the furnace are made from refractory material and doors 24 and 16 are also lined with refractory material. Heat loss through the walls, etc., is kept to a minimum.

In the embodiment according to the present invention the longitudinal cross-sectional shape of the floor 40 of the furnace is not rectangular as in the known closed well furnace. The floor 40 is sloped from the melting bath chamber 20 down towards the heating door 16 end of chamber 10. The slope of the floor over its centre portion 42 is relatively shallow being preferably less than 5°. In a preferred embodiment the slope of the centre portion of the floor 42 is about 3°.

At the end nearest door 24 the floor 44 slopes steeply upwards to guide scrap material 28 (shown dotted) down onto floor portion 42.

At the end nearest door 16 the floor portion 46 slopes less steeply to allow raking or molten metal out of the chamber.

The slope of floor portion 42 assists in providing a convection current (shown dotted) which circulates the molten metal in the path shown. The heated molten metal on the upper part of path 48 therefore flows more rapidly past the scrap 28 thereby melting the scrap at a greater rate than if the floor portion 42 were horizontal. This is extremely advantageous since this considerably increases the throughput of the furnace and hence its efficiency.

Figure 2:
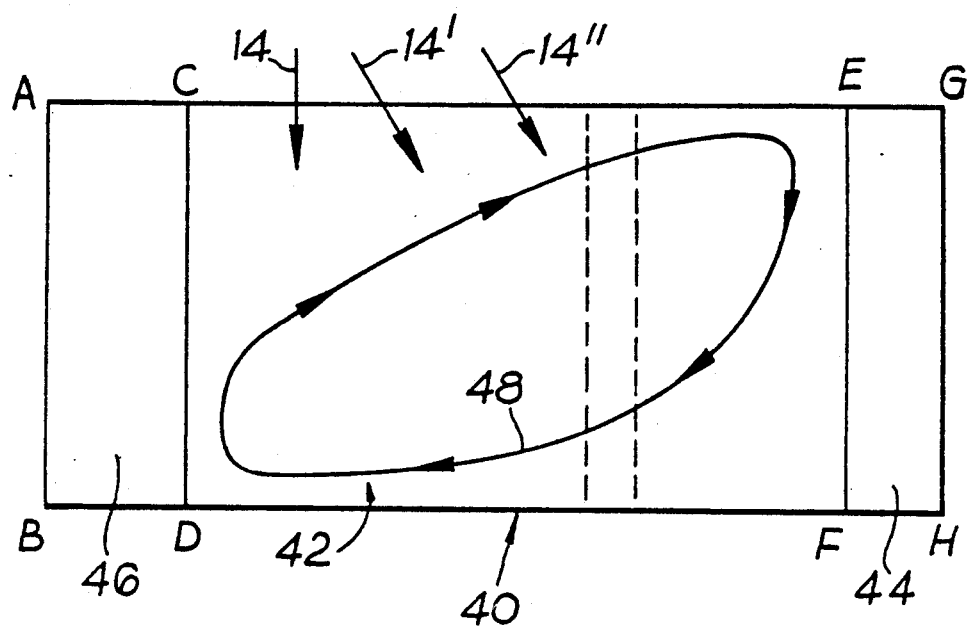
FIG. 2 shows diagrammatically a plan view of the floor of the well.
Figure 3:
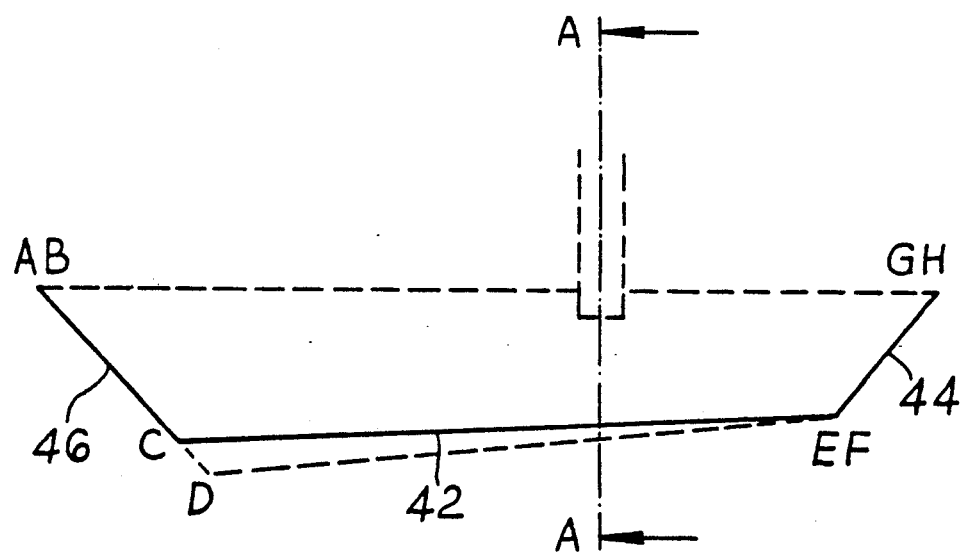
FIG. 3 shows diagrammatically two cross-sections of the floor of FIG. 2 illustrating the diagonal slope concept of the present invention.

With reference now to FIGS. 2 and 3, the floor 40 of the well in plan view resembles a rectangle divided into three smaller rectangles 42, 44 and 46. The corners of the rectangles are given the reference letters A to H.

With reference to FIG. 3 the line F, D is shown dotted to indicate that the corner D is below corner C. The floor of the well therefore in this embodiment not only falls from point E to point C and from point F to point D but also falls from point C to point D.

This creates a tendency for the flow path 48 to be towards corner D as indicated in FIG. 2.

As shown in FIG. 2 the burners 14 can be directed at right angles across the chamber 10 as indicated by first burner 14 or can be directed at an angle as indicated by burners 14', 14''. By directing the burners at an angle the flow of molten metal can be assisted by the blast from the burners. This again increases the melt rate of the furnace.

Figure 4:
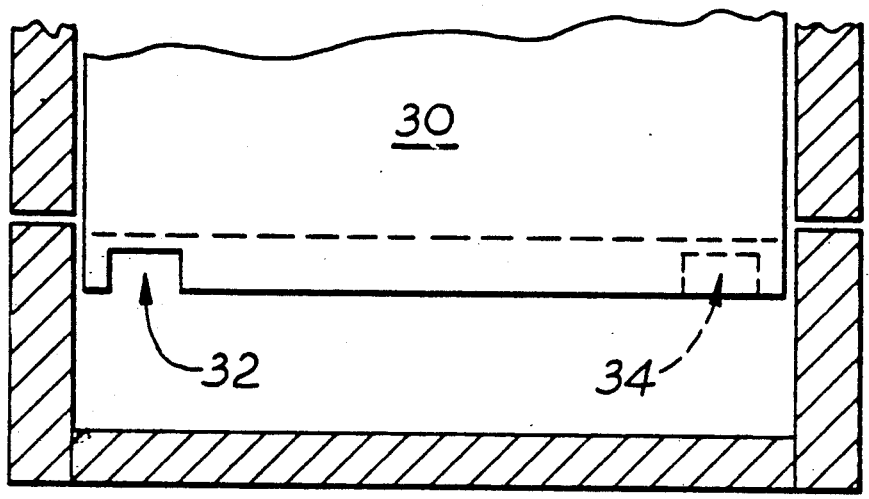
FIG. 4 shows diagrammatically a cross-section of a portion of the CWF furnace taken along line A—A (FIG. 3) illustrating the provision of an opening in the dividing wall.

With reference now to FIG. 4 if a specific flow pattern such as shown in FIG. 2 is required the establishment of such a pattern may be assisted by providing an "opening" 32 in the dividing wall 30. The opening may, depending on the height of the base of wall 30 relative to the upper surface of the molten metal, be above the surface, allowing gases to pass between the furnaces, or just below the surface.

The opening 32 provides an easier passageway for the molten metal and therefore is persuasive in directing the flow of the molten metal.

If required, a further opening such as shown dotted at 34 may be provided to further guide the flow of molten metal on its return journey.

By using a combination of openings, burner directions and floor slopes a considerable achievement can be made to the flow of molten metal and hence the efficiency or melt rate of the furnace is improved.

Figure 5:
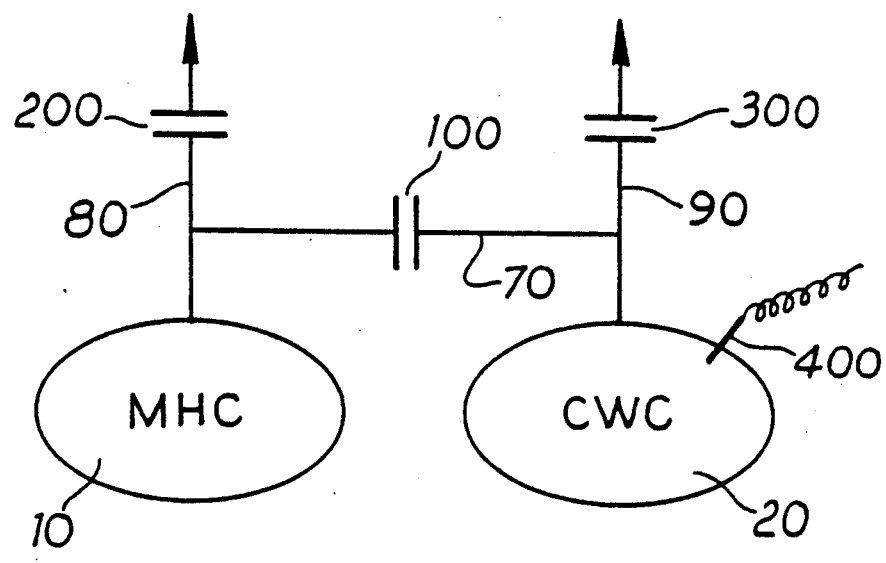
FIG. 5 shows diagrammatically the provision of hot gas and exhaust gas dampers in a CWF according to the present invention.

With reference now to FIG. 5 the two chambers 10 and 20 are drawn diagrammatically. Chamber 10 is connected to chamber 20 via a hot gas duct 70 and exhaust ducts 80 and 90 respectively connect chambers 10 and 20 to an exhaust flue or chimney (not shown). (In known manner the exhaust flues 80, 90 may be connected to a fume purification plant to remove unwanted material from the exhaust gases.)

In hot gas duct 70 a hot gas damper 100 is installed. Normally, the temperature in the main heating chamber 10, by direct heat from the installed burners on that chamber, will be at a higher temperature than the closed well chamber 20. As specified hereinbefore scrap metal will normally be charged into the closed well chamber 20. The temperature in the closed well chamber—using an automatic control system—can be set at any desired level. The automatic control system will open the hot gas damper 100 in the hot gas duct 70 connecting the main heating chamber with the closed well chamber and it will close the flue gas damper 200 which connects the main heating chamber to the flue gas exhaust system. Opening and closing of both said dampers 100, 200 will be controlled in such a way, that the static pressure in the main heating chamber 10 during such occasions, will be held at a higher level than the static pressure in the closed well chamber 20. By doing so, a positive hot gas flow from the main heating chamber through the inter-connecting hot gas duct will be maintained in accordance with the differential pressure held and the inter-connecting hot gas duct.

As long as the temperature in the closed well chamber has not yet reached a set point (desired temperature), a corresponding hot gas flow from the main heating chamber 10 to the closed well chamber 20 in the described way will automatically take place. During charging operations, however, the hot gas damper 100 in the inter-connecting duct system between the two chambers 10, 20 will be kept closed to avoid unnecessary heat loss.

In the event, that by, for example, spontaneous ignition of contaminants on the scrap, the temperature in the closed well chamber rises above the set level (desired temperature), the static pressure in the main heating chamber 10 will be immediately decreased by opening the flue gas damper 200 in the exhaust duct from that chamber fully. At the same time and also immediately, the hot gas damper 100 in the interconnecting duct 70 between both chambers will also open fully, so giving the opportunity to the closed well chamber 20 to dump any excess heat into the main heating chamber 10 without delay.

In order to control temperature in the main heating chamber and also to partially control the volume of flue gas exhausted from both chambers, the burners 14 installed on the main heating chamber 10 will turn down immediately in such an event.

The above operation can be controlled by sensing the temperature in the closed well chamber 20 by means for example of a detector 400. The set temperature is determined by the furnace system but will be at a temperature above that at which the closed well chamber 20 normally operates. Thus in normal operation, once the closed well chamber 20 has been charged and the door 24 has closed the damper 100 will be open and hot air will be supplied from the main heating chamber 10 to the closed well chamber 20 to heat the scrap charged into the chamber 20.

Figure 6:
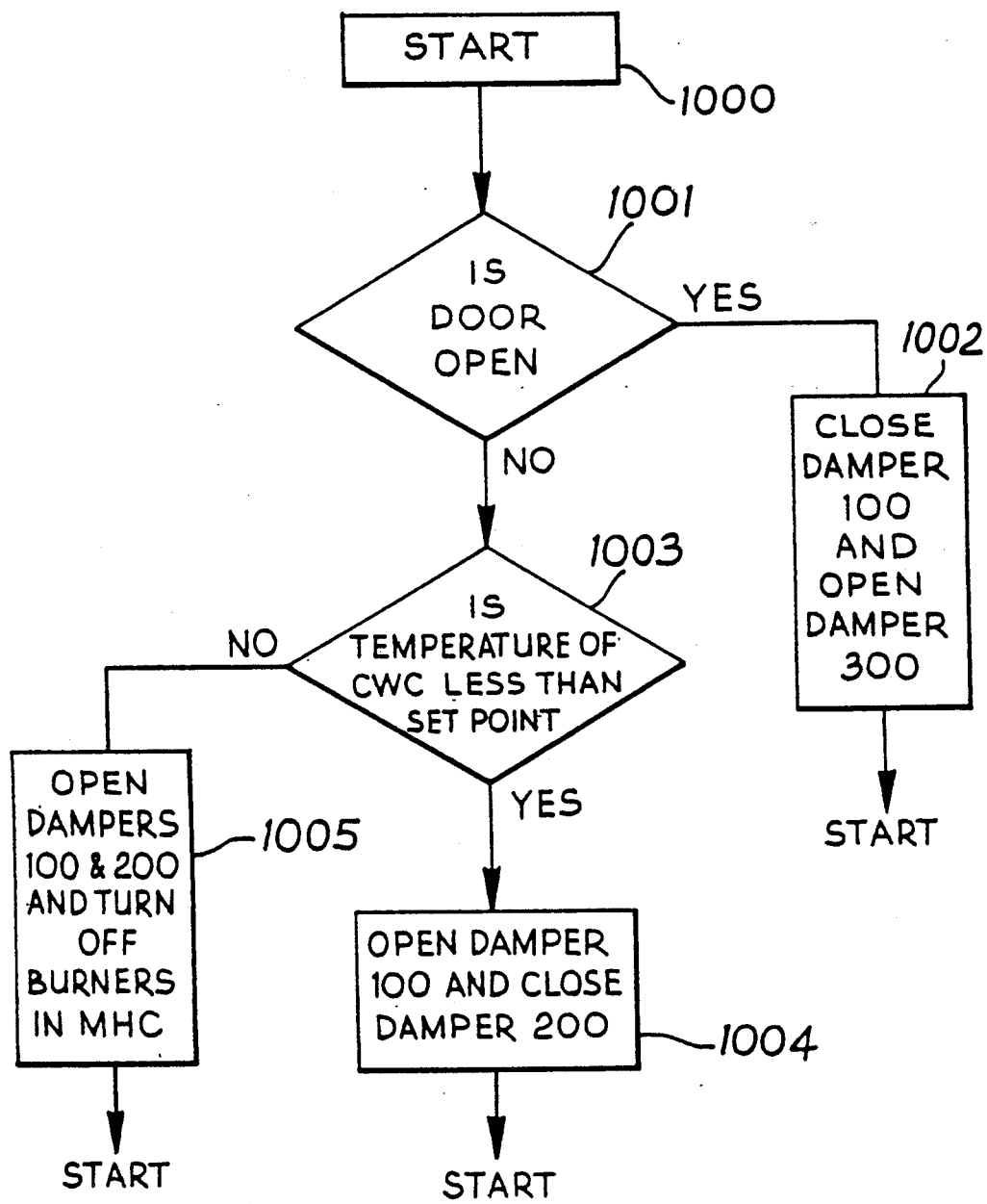
FIG. 6 shows a flow diagram illustrating one possible sequence of operation of the dampers of FIG. 5.

The operation can be controlled for example by any suitable microprocessor and a simplified flow diagram is shown in FIG. 6 for this operation.

On start-up function 1000 the status of the door 24 is monitored by a suitable sensor, in function 1001. If the door is open then, as described in function 1002, damper 100 is closed and damper 300 is opened to allow fumes to pass to the exhaust flue. The door status is then continuously monitored.

If the door is closed then the temperature detector 400 is monitored in function 1003. If the temperature is below the set temperature then damper 100 is opened (or maintained open) and damper 200 is closed in function 1004. The programme then restarts at appropriate intervals (say every 5 milliseconds).

If the temperature rises above the set point temperature (due as explained above for example to excessive burning of new scrap), then function 1004 detects this and enables function 1005 which opens damper 100 and damper 200 and also turns off the burners (if ON) in MHC 20.

It should be realised that the above control sequence may form part of a much more complex control sequence for the furnace and has been considerably simplified to more clearly explain the principle of the inventive feature.

I claim:

1. An improved closed well furnace for melting aluminium scrap into molten metal, the furnace comprising a main heating chamber and a closed well melting chamber having a common floor with a refractory dividing wall separating the main heating chamber and the closed well chamber, the improvement comprising sloping the floor of the well in a downward direction from the melting chamber to the main heating chamber to assist the flow of molten liquid within the furnace.

2. A closed well furnace as described in claim 1 wherein the slope is relatively shallow, being less than 5° from the horizontal.

3. A closed well furnace as described in claim 1 wherein the floor of the well is substantially rectangular in shape and slopes diagonally from one corner to a diagonally opposite corner.

4. A closed well furnace as described in claim 1 wherein at least one hot air burner situated within the main heating chamber burner is positioned to direct a hot air blast, in a direction that forms an acute angle to the wall of the main heating chamber, such that the hot air blast assists the flow of molten liquid within the furnace.

5. A closed well furnace as described in claim 3 wherein the refractory dividing wall is provided with an opening at the surface level of the molten metal to allow a current of metal to flow therethrough.

6. A closed well furnace as described in claim 4 wherein a hot gas duct is provided to connect the main heating chamber and the closed well melting chamber, said hot gas duct including a hot gas damper operative to close the hot gas duct to prevent flow of hot gas therethrough.

7. A closed well furnace as described in claim 6 wherein the position of the hot gas damper is controlled by a control system which monitors the difference in the temperature between the main heating chamber and the closed melting chamber, the control system being normally operative to open the damper when the temperature of the main heating chamber is greater than that of the closed well melting chamber.

8. A closed well furnace as described in claim 6 wherein the damper is closed when scrap to be melted is being introduced into the closed well melting chamber.

9. A closed well furnace as described in claim 3 wherein a hot gas exhaust duct connecting the closed well melting chamber with an exhaust flue is provided, the hot gas exhaust duct including an exhaust gas damper operative to effectively seal off the exhaust duct and further including means for opening the hot gas damper when the temperature in the closed well heating chamber rises above a predetermined set level.

10. A closed well furnace as described in claim 7 wherein the hot gas damper between the closed well melting chamber and the main heating chamber is opened to allow gas flow from the closed well melting chamber to the main heating chamber during the time period that the temperature in the closed well melting chamber is above the predetermined set level.

* * * * *

UNITED STATES PATENT OFFICE
CERTIFICATE OF CORRECTION

Patent No. 5,035,402      Dated  July 30, 1991

Inventor(s)       Adrianus J. Hengelmolen

It is certified that error appears in the above-identified patent and that said Letters Patent is hereby corrected as shown below:

COLUMN 5:

In Claim 4, line 1, the words "claim 1" should be --claim 5--.

Signed and Sealed this

Twelfth Day of January, 1993

Attest:

DOUGLAS B. COMER

Attesting Officer    Acting Commissioner of Patents and Trademarks